United States Patent [19]

Kawase et al.

[11] 4,172,923

[45] Oct. 30, 1979

[54] COMPOSITE MATERIAL FOR VACUUM BRAZING

[75] Inventors: Hiroshi Kawase; Motoyoshi Yamaguchi, both of Nikko, Japan

[73] Assignee: Furukawa Aluminum Co., Ltd., Tokyo, Japan

[21] Appl. No.: 914,547

[22] Filed: Jun. 12, 1978

[30] Foreign Application Priority Data

Jul. 26, 1977 [JP] Japan .................................. 52-89521

[51] Int. Cl.² ............................................ B32B 15/20
[52] U.S. Cl. ...................................... 428/654; 75/146; 138/143; 138/145; 138/171; 138/177; 428/36
[58] Field of Search ..................... 428/654, 36; 75/146; 138/143, 145, 171, 177

[56] References Cited

U.S. PATENT DOCUMENTS

| | | | |
|---|---|---|---|
| 3,355,281 | 11/1967 | Hansley et al. | 75/146 |
| 3,373,483 | 3/1968 | Miller | 29/501 |
| 3,878,871 | 4/1975 | Anthony et al. | 428/654 |

FOREIGN PATENT DOCUMENTS

| | | | |
|---|---|---|---|
| 38-618 | 1/1963 | Japan | 428/654 |
| 425128 | 3/1935 | United Kingdom | 75/146 |
| 1416134 | 12/1975 | United Kingdom . | |

OTHER PUBLICATIONS

Registration Record of Aluminum Association Alloy Designations and Chemical Composition Limits for Wrought Aluminum Alloys, The Aluminum Ass'n., Inc., N.Y., N.Y., 9/1/76.

"UL Clears Way for All-Aluminum Wet Condenser Coil Applications", Heating & Refrigeration News, 5/22/72.

*Primary Examiner*—Arthur J. Steiner
*Attorney, Agent, or Firm*—Armstrong, Nikaido, Marmelstein & Kubovcik

[57] ABSTRACT

This invention relates to a composite material for vacuum brazing comprising a cladding material for vacuum brazing composed of 0.1-2.0 wt. % of zinc, 0.01-2.0 wt. % of at least one member selected from the group consisting of calcium, sodium and potassium and the balance of aluminum, and a core material consisting of aluminum or an aluminum alloy having said cladding material clad onto one surface of both surfaces thereof.

5 Claims, 2 Drawing Figures

COMPOSITE MATERIAL FOR VACUUM BRAZING

BACKGROUND OF THE INVENTION

This invention relates to a composite material for vacuum brazing having excellent cathodic protection effect and to an improvement in the composition of a cladding material used for the composite material.

DESCRIPTION OF THE PRIOR ART

As a composite material having excellent cathodic protection effect, there has conventionally been known a composite material comprising a cladding material of an aluminum alloy containing 0.8-1.3 wt. % of zinc such as AA 7072 alloy, for example, and a core material consisting of AA 3003 alloy or AA 3004 alloy, for example, and having said cladding material clad onto one surface or both surfaces thereof as shown in Table 1. When this composite material is exposed to the corrosive atmosphere, the cladding material consisting of the 7072 alloy, which has a lower potential when compared with other aluminum alloys, is preferentially corroded and thus exhibits the action of preventing the corrosion of the core material, that is, the cathodic protection effect.

In producing a heat-exchanger using such an aluminum composite material, it has been a conventional practice to braze a heat exchanger with a 4343 alloy or 4045 alloy brazing filler shown in Table 3 or a brazing sheet having these brazing filler as the liner, in the air using a flux or in the molten flux. However, partly because of the fact that the flux must be used in this process which is injurious to health, arousing the potential environmental pollution problem, and partly because of the problem of removing the flux after the product is brazed, vacuum brazing which brazes the product without the use of the flux in a vacuum atmosphere, using vacuum brazing fillers such as 4004, X4005 or X4104 alloy as indicated in Table 3 or vacuum brazing clad sheet such as X7, X8, X13 or X14 as indicated in Table 2 lined with these brazing fillers, is rapidly gaining wider application in recent years.

When brazing is made in accordance with this vacuum brazing method, however, zinc contained in AA 7072 alloy as the cladding is evaporated in vacuum and extremely reduces the zinc concentration in the surface layer whereby the cathodic protection effect is hardly present any longer. When exposed to an especially strong corrosive atmosphere which tends to cause pitting corrosion, the pittings grows through the core material and until finally penetrate through the core material.

Note: Table 3 illustrates the chemical composition of the alluminum alloys shown in Tables 1 and 2 as well as the aluminum alloys described in this specification.

Table 1

| | Components of composite products-AA Standard | | | | |
|---|---|---|---|---|---|
| | Component Alloys | | Total thickness of composite | Sides | Cladding thickness per side (percent of composite thickness) |
| Designation | core | cladding | product | clad | Nominal |
| Al clad 3003 sheet and plate | 3003 | 7072 | All | Both | 5 |
| Al clad one side 3003 sheet and plate | 3003 | 7072 | All | One | 5 |
| Al clad 3003 Tube | 3003 | 7072 | All | Inside | 10 |
| | | | | Outside | 7 |
| Al clad 3004 sheet and plate | 3004 | 7072 | All | Both | 5 |

Note: AA means The Aluminum Association

Table 2

| | Components of Vacuum Brazing Composite Products (AA Standard) | | | | |
|---|---|---|---|---|---|
| | Component Alloy | | Total thickness of composite | Sides clad | Cladding thickness per side (percent of composite thickness) |
| Designation | core | cladding | product (mm) | | Nominal |
| X7 Brazing sheet | 3003 | 4004 | less than 0.63 | one | 15 |
| | | | 0.64-1.59 | one | 10 |
| | | | not less than 1.60 | one | 7½ |
| X8 Brazing sheet | 3003 | 4004 | less than 0.63 | both | 15 |
| | | | 0.64-1.59 | both | 10 |
| | | | not less than 1.60 | both | 7½ |
| X14 Brazing sheet | 6951 | 4004 | less than 0.63 | both | 15 |
| | | | 0.64-1.59 | both | 10 |
| | | | not less than 1.60 | both | 7½ |
| X13 Brazing sheet | 6951 | 4004 | less than 0.63 | one | 15 |
| | | | 0.64-1.59 | one | 10 |
| | | | not less than 1.60 | one | 7½ |

Table 3

Aluminum Association Alloy Designations and Chemical Composition Limits for Wrought Aluminum and Aluminum Alloys

| AA Number | Si | Fe | Cu | Mn | Mg | Cr | Zn | Ti | others each | others total | Al Min | Remarks |
|---|---|---|---|---|---|---|---|---|---|---|---|---|
| 1050 | 0.25 | 0.40 | 0.05 | 0.05 | 0.05 | — | 0.05 | 0.03 | 0.03 | — | 99.50 | |
| 1100 | 1.0 | Si + Fe 0.05–0.20 | 0.05 | — | | — | 0.10 | — | 0.05 | 0.15 | 99.00 | |
| 3003 | 0.6 | 0.7 | 0.05–0.20 | 1.0–1.5 | — | — | 0.10 | — | 0.05 | 0.15 | Remainder | |
| 3004 | 0.30 | 0.7 | 0.25 | 1.0–1.5 | 0.8–1.3 | — | 0.25 | — | 0.05 | 0.15 | Remainder | |
| 5005 | 0.30 | 0.7 | 0.20 | 0.20 | 0.50–1.1 | 0.10 | 0.25 | — | 0.05 | 0.15 | Remainder | |
| 6951 | 0.20–0.50 | 0.8 | 0.15–0.40 | 0.10 | 0.40–0.8 | — | 0.20 | — | 0.05 | 0.15 | Remainder | |
| 7072 | 0.7 | Si + Fe | 0.10 | 0.10 | 0.10 | — | 0.8–1.3 | — | 0.05 | 0.15 | Remainder | |
| 4343 | 6.8–8.2 | 0.8 | 0.25 | 0.10 | — | — | 0.20 | — | 0.05 | 0.15 | Remainder | Furnace or dip Brazing Filler Metal |
| 4045 | 9.0–11.0 | 0.8 | 0.30 | 0.05 | 0.05 | — | 0.10 | 0.20 | 0.05 | 0.15 | Remainder | |
| 4004 | 9.0–10.5 | 0.8 | 0.25 | 0.10 | 1.0–2.0 | — | 0.20 | — | 0.05 | 0.15 | Remainder | Vacuum Brazing Filler Metal |
| X4005 | 9.5–11.0 | 0.8 | 0.25 | 0.10 | 0.20–1.0 | — | 0.20 | — | 0.05 | 0.15 | Remainder | |
| X4104 | 9.0–10.5 | 0.8 | 0.25 | 0.10 | 1.0–2.0 | — | 0.20 | 0.02–0.20 Bi | 0.05 | 0.15 | Remainder | |

SUMMARY OF THE INVENTION

It is a primary object of the present invention to provide a composite material for vacuum brazing which restricts the evaporation of zinc in the vacuum and enhances the cathodic protection effect.

It is another object of the present invention to provide a composite material for vacuum brazing which enhances the cathodic protection effect and at the same time, improves the brazability.

These objects of the invention can be accomplished by cladding onto one surface or both surfaces of a core material consisting of aluminum or an aluminum alloy a cladding material consisting of an aluminum alloy composed of 0.1–2.0 wt. % of zinc, 0.01–2.0 wt. % of at least one member selected from the group consisting of calcium, sodium and potassium and the balance of aluminum.

The composite material for vacuum brazing in accordance with the present invention may have an optional shape such as a sheet, a plate, a tube, a case a tank and the like that has a cladding material clad onto one surface or both surfaces of the cores material.

In addition to aluminum such as AA1050 and 1100, examples of the core material include aluminum alloys such as AA3003 alloy, 3004 alloy, 5005 alloy and 6951 alloy.

The cladding material to be clad onto this core material is an aluminum alloy consisting of 0.1–2.0 wt. % of zinc, 0.01–2.0 wt. % of at least one member selected from the group consisting of calcium, sodium and potassium and the balance of aluminum. (Hereinafter the term "%" designates "% by weight".) In the aluminum alloy forming this cladding layer, zinc plays the role of reducing the potential of the aluminum alloy, and calcium, sodium and potassium evaporate before zinc during brazing in the vacuum, remain on the surface of the composite material as the simple substances of calcium, sodium and potassium or their oxide layers and thus prevent the evaporation of zinc. These calcium, sodium and potassium may be blended in an optional proportion to provide the same effect.

In the present invention, the amounts of the alloy components forming the abovementioned cladding material are restricted in the abovementioned range for the following reasons. If the amount of zinc is not greater than 0.1%, the potential of the cladding material relative to the core material can not be reduced sufficiently to exhibit the cathodic protection effect. On the contrary, even if the amount exceeds 2.0%, the effect of addition is saturated and rather negative with respect to formability and cost. In addition, the flow of brazing filler becomes inferior, thereby reducing the brazability. If the amounts of calcium, sodium and potassium are not greater than 0.01%, they can not sufficiently exhibit the action of preventing the evaporation of zinc. If the amount exceeds 2.0%, the effect of addition becomes saturated and the flow of brazing filler is hindered, hence, good brazing becomes infeasible.

The production method of the composite material for vacuum brazing in accordance with the present invention is as follows. For producing a clad sheet, for example, a cladding material is put onto a core material of the sheet-like form and then hot rolled and bonded and then cold rolled. In producing a clad tube, the clad sheet thus obtained is subjected to the roll-forming in the tubular form and the contacting surface is thereafter electro-welded. Alternatively, the core material and the cladding material are shaped in advance into the tubular shape billet and combined and the resulting composite billet is then extruded to form the tube and the composite tube then is drawn.

In the present invention, there is no specific limitation to the composite ratio of the cladding layer to the total thickness of the composite material, that is, the clad ratio. Depending upon the thickness of materials used, however, a suitable ratio is generally from 3 to 20%.

The composite material formed in the abovementioned method is produced into a sheet or a tube and then out and bent into a desired shape and dimensions. The resulting members are assembled into a water chamber of a header or a water pipe of a heat exchanger, for example, together with a brazing filler for vacuum brazing such as a 4004 alloy wire shown in Table 3 (a wire of an aluminum alloy containing 10% Si and 1.5% Mg) or an X8 sheet for vacuum brazing shown in Table 2 (a brazing sheet comprising a filler for brazing consisting of an aluminum alloy containing 10%

Si and 1.5% Mg and a core material of an AA 3003 alloy having said filler 10% clad on both surfaces thereof). The assembly is then heated in a vacuum of $1\times 10^{-5} \sim 1\times 10^{-4}$ Torr at 590°-610° C. whereby the brazing filler is meted without the use of a flux and brazing is made at the close contact portions between the composite material of the present invention and other members.

In the brazing in the vacuum, calcium, sodium and potassium contained in the cladding material of the composite material of the present invention are first evaporated before the evaporation of zinc and their single substance or their oxide attach to and cover the surface of the cladding material, thereby preventing the evaporation of zinc and causing zinc to remain inside the surface layer. As a result, the residual concentration of zinc contained in the cladding material is maintained at a high level and the solution potential of the cladding material can be kept at a lower level in comparison with the core material, thereby exhibiting an excellent cathodic protection effect.

DETAILED DESCRIPTION OF THE PREFERRED EMBODIMENTS

Example 1

Figure 1:
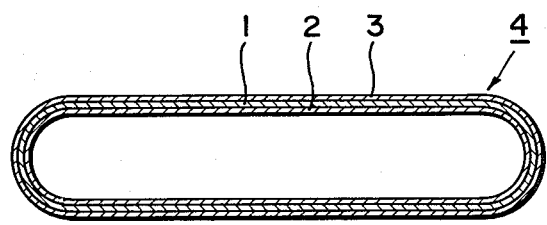
FIG. 1 is a sectional view of the clad tube for vacuum brazing in accordance with an embodiment of the present invention.

Using a 3003 alloy, an ingot of 50 mm×180 mm×200 mm is produced and homogenized at 600° C. for 3 hours. Both surfaces of the ingot are then scalped to form a core material of 40 mm×180 mm×200 mm.

On the other hand, as the cladding material to be clad onto the core material, Zn and (Ca, Na, K) are added to Al in such proportions as to form the aluminum alloys Nos. 1-20 each having a predetermined composition as shown in the later-appearing Table 4. (in this case, Zn are add in the form of an Al-20% Zn mather alloy and Li are added in the form of an Al-10% Li mather alloy). Each alloy is melted and casted to form an ingot of 50 mm×180 mm×200 mm.

The ingot thus obtained is homogenized at 520° C. for 3 hours and both surfaces of the ingot are scalped. The ingot is then heated and hot-rolled at 500° C. to a thickness of 5 mm, and a sheet of 5 mm×180 mm×200 mm is cut out from the material for the cladding material.

After each of the core material and the cladding material is degreased with trichloroethylene, the cladding material is clad onto both surfaces of the core material, heated to 500° C., hot-rolled to a thickness of 5 mm and thereafter cold rolled to obtain a clad sheet of a thickness of 1 mm.

In the clad sheet, the cladding layer has a thickness of 10% on each surface on the basis of the total thickness. The sheet-like composite material thus obtained is dipped in a 5% NaCl solution and the surface potential of the composite material is measured at 20° C. with reference to a saturated calomel electrode as the standard. Separately the abovementioned composite material is heated at 600° C. for 3 minutes in the vacuum of $5\times 10^{-5}$ Torr in the same way as in the ordinary brazing condition, then taken out from the furnace and subjected to the measurement of the surface solution potential in the a 5% NaCl solution under the same condition as above. The change in the surface solution potential of the composite material before and after heating is illustrated in Table 4. For reference, the surface potential is measured also of the AA 3003 alloy, used as the core material, before and after heating with the result shown in Table 4.

In order to examine the corrosion resistance of each composite material after heating, the maximum depth of pitting is measured after the composite material is dipped in hot water at 40° C. (service water plus 10 ppm Cu) for 2 months. To further examine the brazability, the abovementioned sheet-like composite material is combined in a reversed T-shape with a 1 mm-thick brazing sheet X8 (a composite material for vacuum brazing comprising an Al-10%Si-1.5% Mg Alloy as the cladding and an AA 3003 alloy as the core having the cladding 10% clad on each surface) and brazed them at 600° C. for 3 minutes in a vacuum of $5\times 10^{-5}$ Torr. The results are shown in Table 4.

Comparative Example 1

Each cladding material having the composition No. 21-24 shown in Table 4 is clad onto both surfaces of an AA 3003 alloy as the core material in the same way as in Example 1 to produce a 1 mm-thick clad sheet. The surface potential before and after heating, the maximum depth of pitting at the time of dipping of each composite material in the hot water and brazability are respectively measured in the same way as in Example 1. The results are also shown in Table 4.

Table 4

| | Composite material | | | | | Potential in 5% NaCl solution (V) | | Maximum depth of pitting (mm) | Brazability |
|---|---|---|---|---|---|---|---|---|---|
| | Core material | Composition of cladding material (wt. %) | | | | before heating | after heating | | |
| | | Zn | Ca | Na | K | Al | | | |
| Reference Example 1 | AA 3003 | — | — | — | — | — | −0.67 | −0.67 | 0.31 | O |
| No. 1 | AA 3003 | 1.0 | 0.01 | — | — | balance | −0.87 | −0.96 | 0.11 | O |
| No. 2 | AA 3003 | 1.0 | 0.05 | — | — | balance | −0.85 | −0.98 | 0.10 | O |
| No. 3 | AA 3003 | 1.0 | 0.50 | — | — | balance | −0.84 | −1.11 | 0.09 | O |
| No. 4 | AA 3003 | 1.0 | 0.90 | — | — | balance | −0.85 | −1.12 | 0.09 | O |
| No. 5 | AA 3003 | 1.0 | 1.80 | — | — | balance | −0.86 | −1.12 | 0.08 | O |
| No. 6 | AA 3003 | 1.0 | — | 0.01 | — | balance | −0.87 | −0.95 | 0.12 | O |
| No. 7 | AA 3003 | 1.0 | — | 0.05 | — | balance | −0.86 | −0.98 | 0.09 | O |
| No. 8 | AA 3003 | 1.0 | — | 0.50 | — | balance | −0.84 | −1.05 | 0.09 | O |
| No. 9 | AA 3003 | 1.0 | — | 0.90 | — | balance | −0.84 | −1.05 | 0.08 | O |
| No. 10 | AA 3003 | 1.0 | — | 1.80 | — | balance | −0.87 | −1.05 | 0.09 | O |
| No. 11 | AA 3003 | 1.0 | — | — | 0.01 | balance | −0.87 | −0.92 | 0.11 | O |

Table 4-continued

| | Core material | Composite material Composition of cladding material (wt. %) | | | | | Potential in 5% NaCl solution (V) | | Maximum depth of pitting (mm) | Brazability |
| --- | --- | --- | --- | --- | --- | --- | --- | --- | --- | --- |
| | | Zn | Ca | Na | K | Al | before heating | after heating | | |
| No. 12 | AA 3003 | 1.0 | — | — | 0.05 | balance | −0.83 | −0.95 | 0.10 | O |
| No. 13 | AA 3003 | 1.0 | — | — | 0.50 | balance | −0.86 | −0.99 | 0.10 | O |
| No. 14 | AA 3003 | 1.0 | — | — | 0.90 | balance | −0.84 | −0.99 | 0.08 | O |
| No. 15 | AA 3003 | 1.0 | — | — | 1.80 | balance | −0.84 | −1.01 | 0.09 | O |
| No. 16 | AA 3003 | 1.0 | 0.01 | 0.01 | | balance | −0.89 | −0.95 | 0.09 | O |
| No. 17 | AA 3003 | 1.0 | | 0.02 | 0.02 | balance | −0.85 | −0.99 | 0.09 | O |
| No. 18 | AA 3003 | 1.0 | 0.05 | | 0.03 | balance | −0.83 | −1.05 | 0.08 | O |
| No. 19 | AA 3003 | 1.0 | 0.30 | 0.20 | 0.30 | balance | −0.84 | −1.06 | 0.08 | O |
| No. 20 | AA 3003 | 1.0 | 0.50 | 0.50 | 0.50 | balance | −0.84 | −1.09 | 0.09 | O |
| Comparative Example 1 | | | | | | | | | | |
| No. 21 | AA 3003 | 1.0 | — | — | — | balance | −1.05 | −0.80 | 0.29 | O |
| No. 22 | AA 3003 | 1.0 | 0.005 | | | balance | −0.95 | −0.80 | 0.23 | O |
| No. 23 | AA 3003 | 1.0 | | 0.005 | | balance | −0.95 | −0.79 | 0.25 | O |
| No. 24 | AA 3003 | 1.0 | 1.0 | 1.0 | 0.5 | balance | −0.83 | −1.15 | 0.09 | X |

Remarks:
O:Perfect brazing
Δ:Non-uniform brazing
X:No brazing

As can be seen from the results shown in Table 4, in each of the products of the present invention, the cladding layer has a lower potential than the potential (−0.67 V) of the core material, exhibits excellent cathodic protection effect and provides a perfect joint condition.

EXAMPLE 2

Using an AA 1100 alloy as the core material, an ingot of 50 mm × 180 mm × 200 mm is produced and homogenized at 520° C. for 3 hours. Both surfaces of the ingot is then scalped to form a core material of 40 mm × 180 mm × 200 mm.

On the other hand, as the cladding material, Al-Zn-(Ca, Na, K) alloys each having the composition of Nos. 25–44 shown in Table 5 is casted to form an ingot of 50 mm × 180 mm × 200 mm. The ingot is homogenized, scalped, heated and hot-rolled into a thickness of 2.2 mm, and a sheet of 2.2 mm × 180 mm × 200 mm is cut out from the material to form the cladding material in the same way as in Example 1.

After each of the core material and the cladding material thus obtained is degreased with trichloroethylene, the cladding material is clad onto both surfaces of the core material, heated to 520° C., hot-rolled to a thickness of 5 mm and thereafter cold rolled to obtain a clad sheet of a thickness of 1 mm.

In the clad sheet, the cladding layer has a thickness of 5% on each surface on the basis of the total thickness.

The surface potential before and after heating of each testpiece, the maximum depth of pitting after it is dipped into the service water and its brazability are respectively measured under the same condition as in the abovementioned Example 1. For reference, the same measurements are made also of the AA 1100 alloy used as the core material. The results of these measurements are illustrated in Table 5.

Comparative Example 2

For comparison, each cladding material having the composition No. 45–48 shown in Table 5 is clad onto both surfaces of the AA 1100 alloy as the core material in the same way as in Example 2 to produce a 1 mm-thick clad sheet and various properties of these products are measured in the same way as in Example 1. The results of measurement are also shown in Table 5.

Table 5

| | Core material | Composite material Composition of cladding material (wt. %) | | | | | Potential in 5% NaCl solution (V) | | Maximum depth of pitting (mm) | Brazability |
| --- | --- | --- | --- | --- | --- | --- | --- | --- | --- | --- |
| | | Zn | Ca | Na | K | Al | before heating | after heating | | |
| Reference Example 2 | AA 1100 | — | — | — | — | — | −0.71 | −0.71 | 0.18 | O |
| No. 25 | AA 1100 | 0.1 | 0.5 | — | — | balance | −0.82 | −0.90 | 0.06 | O |
| No. 26 | AA 1100 | 0.3 | 0.5 | — | — | balance | −0.83 | −0.90 | 0.05 | O |
| No. 27 | AA 1100 | 0.5 | 0.5 | — | — | balance | −0.83 | −0.96 | 0.05 | O |
| No. 28 | AA 1100 | 1.0 | 0.5 | — | — | balance | −0.83 | −1.08 | 0.04 | O |
| No. 29 | AA 1100 | 2.0 | 0.5 | — | — | balance | −0.88 | −1.09 | 0.04 | O |
| No. 30 | AA 1100 | 0.1 | — | 0.5 | — | balance | −0.83 | −0.93 | 0.07 | O |
| No. 31 | AA 1100 | 0.3 | — | 0.5 | — | balance | −0.83 | −0.94 | 0.07 | O |
| No. 32 | AA 1100 | 0.5 | — | 0.5 | — | balance | −0.84 | −0.95 | 0.05 | O |
| No. 33 | AA 1100 | 1.0 | — | 0.5 | — | balance | −0.85 | −1.04 | 0.05 | O |
| No. 34 | AA 1100 | 2.0 | — | 0.5 | — | balance | −0.86 | −1.05 | 0.05 | O |
| No. 35 | AA 1100 | 0.1 | — | — | 0.5 | balance | −0.82 | −0.92 | 0.06 | O |
| No. 36 | AA 1100 | 0.3 | — | — | 0.5 | balance | −0.83 | −0.96 | 0.06 | O |
| No. 37 | AA 1100 | 0.5 | — | — | 0/5 | balance −0.83 | −0.97 | 0.06 | O |
| No. 38 | AA 1100 | 1.0 | — | — | 0.5 | balance | −0.84 | −1.00 | 0.05 | O |
| No. 39 | AA 1100 | 2.0 | — | — | 0.5 | balance | −0.87 | −1.05 | 0.05 | O |
| No. 40 | AA 1100 | 0.1 | 0.2 | 0.2 | 0.2 | balance | −0.82 | −0.92 | 0.06 | O |
| No. 41 | AA 1100 | 0.3 | 0.2 | 0.2 | 0.2 | balance | −0.83 | −0.94 | 0.06 | O |
| No. 42 | AA 1100 | 0.5 | 0.2 | 0.2 | 0.2 | balance | −0.83 | −0.96 | 0.05 | O |

Table 5-continued

| | Composite material | | | | | Potential in 5% NaCl solution (V) | | Maximum depth of pitting (mm) | Brazability |
|---|---|---|---|---|---|---|---|---|---|
| | Core material | Composition of cladding material (wt. %) | | | | before heating | after heating | | |
| | | Zn | Ca | Na | K | Al | | | |
| No. 43 | AA 1100 | 1.0 | 0.2 | 0.2 | 0.2 | balance | −0.87 | −1.05 | 0.04 | O |
| No. 44 | AA 1100 | 2.0 | 0.2 | 0.2 | 0.2 | balance | −0.88 | −1.06 | 0.05 | O |
| Comparative Example 2 | | | | | | | | | |
| No. 45 | AA 1100 | 1.0 | — | — | — | balance | −1.00 | −0.80 | 0.19 | O |
| No. 46 | AA 1100 | 0.05 | 0.5 | — | — | balance | −0.82 | −0.83 | 0.18 | O |
| No. 47 | AA 1100 | 0.05 | — | 0.5 | — | balance | −0.83 | −0.83 | 0.17 | O |
| No. 48 | AA 1100 | 2.5 | 0.2 | 0.2 | 0.2 | balance | −0.83 | −1.11 | 0.05 | Δ |

As can be clearly seen from Table 5, the products in accordance with the present invention have the maximum depth of pitting of not greater than 0.07 mm, exhibit excellent cathodic protection effect and provide excellent brazability. It is confirmed that the amount added of zinc is most preferably in the range of from 0.1 to 2.0%.

EXAMPLE 3

AA 3003 alloy ingot is homogenized and its outer surface is scalped. At the same time, the ingot is bored so that a billet in size of 230 mm O.D. and 120 mm I.D. with length of 500 mm was obtained as a core material.

On the other hand, aluminum alloys having respectively Zn and (Ca, Na, K) contents of Nos. 49 and 52 shown in Table 6 are melted and casted to form a billet of an outer diameter of 230 mm$\phi$ and a length of 500 mm, which is homogenized at 520° C. for 3 hours and extruded at 450° C. to form a tube of an outer diameter of 118 mm$\phi$ and a thickness of 40 mm as the cladding material.

After each of the abovementioned core and cladding materials is degreased with trichloroethylene, the cladding material is inserted into the inside of the core material to form a composite billet.

After the composite billet is heated to 450° C., it is hot extruded at that temperature to obtain a tube clad on the inner surface (having an outer diameter of 60 mm$\phi$ and a thickness of 10 mm).

The tube is further drawn into a clad tube having a thickness of 0.4 mm and the cladding layer of a thickness of 0.02 mm and an outer diameter of 10 mm$\phi$. The clad tube is cut in a length of 500 mm to form testpieces. After the testpiece is heated at 600° C. for 3 minutes in a vacuum of $5\times10^{-5}$ Torr, the service water of 80° C. is caused to circulate through the inside of the tube to thereby perform the corrosion resistance test for 2 months. The maximum depth of the pitting occurring on the inner surface of the tube is measured with the result shown in Table 6.

Comparative Example 3

The cladding material having the composition of No. 53 shown in Table 6 is produced in the same way as in Example 3 to form a clad tube having a thickness of 0.4 mm and the cladding layer of a thickness of 0.02 mm and an outer diameter of 10 mm$\phi$. The testpiece is then produced in the same way as in Example 3. The corrosion resistance test is performed under the same condition as in Example 3 to thereby measure the maximum depth of pitting with the results shown in Table 6.

For reference, the corrosion resistance is made also of the tube consisting of an AA 3003 alloy alone with the result shown in Table 6.

Table 6

| | Composite material | | | | | | Maximum depth of pitting (mm) |
|---|---|---|---|---|---|---|---|
| | Core material | Composition of cladding material (wt. %) | | | | | |
| | | Zn | Ca | Na | K | Al | |
| Example 3 | | | | | | | |
| No. 49 | AA 3003 | 1.0 | 0.5 | — | — | balance | 0.020 |
| No. 50 | AA 3003 | 1.0 | — | 0.5 | — | balance | 0.018 |
| No. 51 | AA 3003 | 1.0 | — | — | 0.5 | balance | 0.019 |
| No. 52 | AA 3003 | 1.0 | 0.2 | 0.2 | 0.2 | balance | 0.019 |
| Comparative Example 3 | | | | | | | |
| No. 53 | AA 3003 | 1.0 | — | — | — | balance | 0.098 |
| Reference | AA 3003 | — | — | — | — | balance | 0.120 |

It can be seen from Table 6 above that whereas the pitting remains within the cladding layer in the products of the present invention, the pitting reaches the core material in the product of the Comparative Example and hence, the products of the present invention are confirmed to have excellent cathodic protection effect.

EXAMPLE 4

Cladding material consisting of an aluminum alloy of the compositions No. 1 shown in Table 7 is clad onto each surface of an AA 3003 alloy as the core material in a thickness of 10% of the total thickness, hot rolled and then cold rolled to form a 0.4 mm-thick clad sheet (thickness of cladding layer on each surface=0.04 mm).

A clad tube of an outer diameter of 9.2 mm$\phi$ and a thickness of 0.4 mm is produced from this cald sheet strip (thickness of 0.4 mm, width of 28.5 mm and a length of l) by the production method of an electroweld tube. The resulting tube is flat-shaped using a roll to form a flat tube (4) of a width of 13.2 mm, a height of 2.2 mm and a thickness of 0.4 mm having both inner and outer surfaces clad as shown in FIG. 1.

Figure 2:
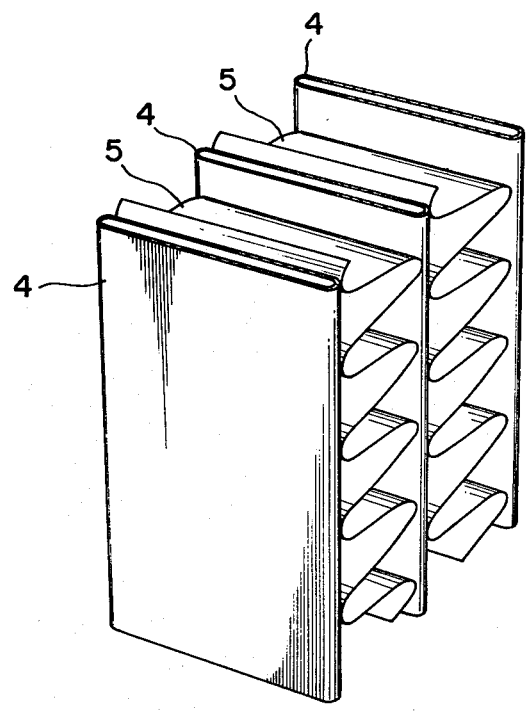
FIG. 2 is a partially perspective view of a radiator core using the clad tube shown in FIG. 1, wherein reference numeral 1 designates a core; 2 is an inner cladding material; 3 is an outer cladding material; 4 is a flat tube having both surfaces clad; and 5 is a fin member.

On the other hand, a corrugated fin is produced from an X8 sheet strip for vacuum brazing (thickness=0.16 mm, a width of 32 mm and a length of l) and the corrugated fin (5) thus produced is combined with the abovementioned flat tube (4) as shown in FIG. 2 and heated at 600° C. for 3 minutes in a vacuum of $5\times10^{-5}$ Torr to thereby form a radiator core by a vacuum brazing method.

Two radiator cores are produced for the cladding compositions, one subjected to the corrosion test from the inner surface of the tube and the other to the corrosion test from the outer surface.

The corrosion test from the inner surface is made by circulating hot water at 80° C. (service water plus 10 ppm Cu) for 10 months to determine the maximum depth of pitting while the corrosion test on the outer surface is made by subjecting the core as a whole to the soft spray test for 10 months in accordance with JIS Z2371 to determine the maximum depth of pitting on the outer surface of the tube.

Table 7

| | First clad tube | | | | Corrosion test on inner surface of tube (by hot water circulation test) Maximum depth of pitting (mm) | Corrosion test on outer surface of tube (by salt spray test) Maximum depth of pitting (mm) | Brazability on outer surface of tube |
|---|---|---|---|---|---|---|---|
| | Core material | Zn | Composition of cladding material on inner and outer surfaces (wt. %) Ca | Al | | | |
| Example 4 | | | | | | | |
| No. 1 | AA 3003 | 1.0 | 0.15 | balance | 0.04 | 0.04 | fair |
| Comparative Example 4 | | | | | | | |
| No. 2 | AA 3003 | 1.0 | — | balance | 0.32 | 0.39 | fair |

The results are illustrated in Table 7. The brazability between the flat tube and fin material is also shown in the Table 7.

Comparative Example 4

For comparison, a cladding material consisting of an Al-1.0% Zn alloy of the composition No. 2 shown in Table 7 is clad onto each surface of a core material consisting of an AA 3003 alloy in the thickness of 10% on the total thickness, then hot rolled and cold rolled to form a 0.4 mm-thick clad sheet. A flat tube having both inner and outer surfaces clad is produced from this clad sheet in the same way as in Example 4. The resulting flat tube is combined with an X8 fin material and vacuum-brazed in the same way as in Example 4 to thereby form a radiator core.

The corrosion test on both inner and outer surfaces is made of the core thus formed in the same way as in Example 4 with the results shown in Table 7.

It is confirmed from the test results that the tube using the Al-Zn-(Ca, Na, K) alloy as the cladding material sufficiently protects the tube even after vacuum brazing because of the cathodic protection effect.

As explained above, in accordance with the composite material for vacuum brazing of the present invention, evaporation of calcium, sodium and potassium covers the surface of the composite material, restricts the evaporation of zinc and enhances the residual concentration of zinc. Consequently, there is obtained a composite material having both excellent cathodic protection effect and brazability. The composite material so obtained is especially suited as a material for an aluminum heat exchanger which is exposed to a corrosive atmosphere.

What is claimed is:

1. A composite material for vacuum brazing comprising an aluminum alloy consisting of 0.1-2.0 wt. % of zinc, 0.01-2.0 wt. % of at least one member selected from the group consisting of calcium, sodium and potassium, the balance of aluminum as the cladding material, and aluminum or an aluminum base alloy as the core material having said cladding material clad onto one or both surfaces thereof, said cladding material having a lower electrode potential than said core material, whereby said cladding material exhibits a cathodic protection effect.

2. The composite material for vacuum brazing as defined in claim 1 wherein when said composite material is a sheet, said composite material is obtained by superposing said cladding material on said core material in the ingot form and hot rolling them together and cold rolling.

3. The composite material for vacuum brazing as defined in claim 1 wherein when said composite material is a tube, said composite material is obtained by roll-forming a clad sheet in a tubular form and electro-welding the contacting surfaces thereof.

4. The composite material for vacuum brazing as defined in claim 1 wherein when said composite material is a tube, said composite material is obtained by shaping in advance said core material and said cladding material in a tubular form, composing them together and extrusion-forming the composite tube and drawing the composite tube.

5. The composite material for vacuum brazing as defined in claim 1 wherein the composite ratio of said cladding material to the total thickness of said composite material is in the range of from 3 to 20%.

* * * * *